United States Patent Office 2,979,342
Patented Apr. 11, 1961

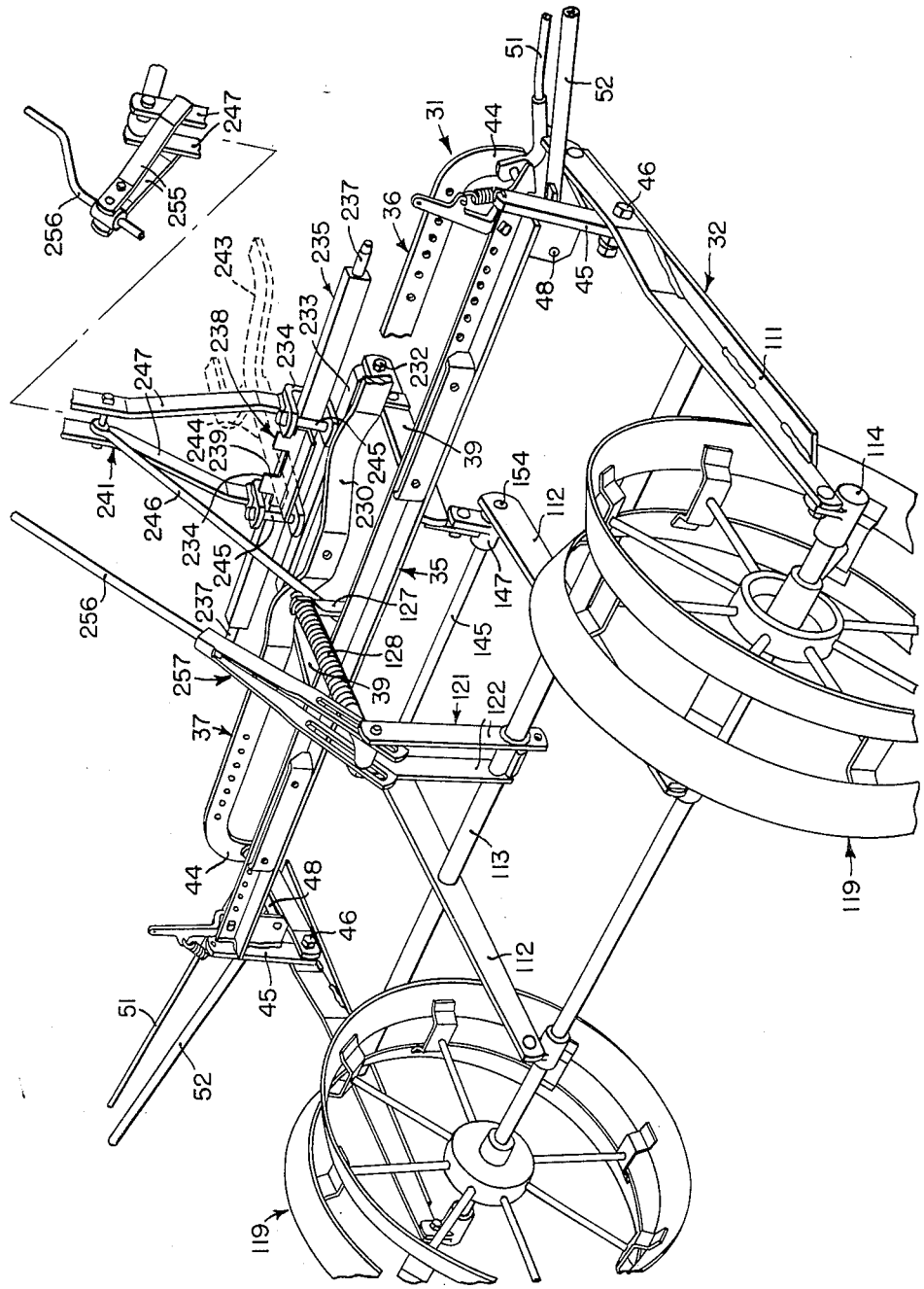

2,979,342

PLANTERS

William P. Oehler and Arthur J. Immesoete, Moline, Ill., assignors, by mesne assignments, to Deere & Company, a corporation of Delaware Original application Sept. 14, 1953, Ser. No. 380,012, now Patent No. 2,917,117, dated Dec. 15, 1959. Divided and this application July 10, 1958, Ser. No. 747,795

1 Claim. (Cl. 280—474)

This application is a division of our copending application (A–2383) Ser. No. 380,012, filed September 14, 1953, for Tractor-Mounted Planter, now U.S. Patent 2,917,117, issued December 15, 1959.

The present invention relates generally to agricultural implements and more particularly to planting implements, such as cotton and corn planters.

The object and general nature of the present invention is the provision of a planter of the tractor-mounted type in which provision is made for rapid and convenient attachment of the planting implement to and disconnection from the tractor. More specifically, it is a feature of this invention to provide a new and improved hitch frame particularly adapting the planter of the present invention to tractors having a three-point hitch system with upper and lower vertically and laterally swingable links.

These and other objects and advantages of the present invention will be apparent to those skilled in the art after a consideration of the following detailed description, taken in conjunction with the accompanying drawings in which the single figure is a fragmentary perspective view showing the principles of this invention as incorporated in a tractor-mounted planter.

A planter of the present invention is shown as adapted to be mounted on the tractor of the three-point hitch type that is conventional, so far as the present invention is concerned. Such tractors are equipped with a pair of lower draft links and an upper compression link connected with the rear portion of the tractor for both vertical and lateral swinging.

The planter in which the principles of the present invention have been incorporated is indicated in its entirety by the reference numeral 30 and includes among other things a main frame 31, and a press wheel frame 32, swingably connected at its forward portion with the main frame 31. The latter comprises a transverse frame member in the form of an angle 35, a pair of right- and left-hand front frame members 36 and 37 and a pair of generally fore-and-aft extending bars 39. The right- and left-hand front frame members 36 and 37 are similar construction, each including a laterally extending bar section 41 connected at its inner end to the associated fore-and-aft extending bar 39. The laterally outer end of each of the front frame bars 41 is provided with a downwardly turned apertured bracket section 44, and fixed to each of the laterally outer ends of the rear frame angle 35 is a depending bracket section 45. The lower end of each bracket section 45 is apertured to receive a pivot member 46 on which the associated outer frame member of the press wheel frame 32 is pivotally mounted for generally vertical swinging movement relative to the main frame 31. Each bracket 45 includes an auxiliary section that is apertured so as to provide an opening in alignment with an opening in the lower downturned portion 44 of the associated front frame bar 41. Disposed in each pair of said openings is a shaft member 48 to which the inner ends of the associated front and rear marker arms sections 51 and 52 are fixed.

The press wheel frame 32 comprises a pair of laterally outer generally fore-and-aft extending frame angles 111 and a pair of generally fore-and-aft extending laterally inner frame bars 112. The bars 111 and 112 are rigidly secured, as by welding, to a transverse reenforcing shaft section 113, and the forward portions of the laterally outer bars 111 are apertured to receive the pivot members 46 mentioned above. The rear end of each of the press wheel frame bars 111 and 112 carries a bearing bracket 114, each preferably being secured to the associated frame bar by suitable bolt means 115. The bearing portions of the brackets 114 are disposed in transverse alignment and rotatably receive a press wheel shaft 118 to which press wheels 119 are securely fixed, as by any suitable means. Preferably, the press wheel 119 on each side of the implement is disposed between the frame bars 111 and 112 at that side of the tractor.

Rigidly secured to the central portion of the reenforcing shaft section 113 is a vertically extending standard 121, preferably comprising a pair of vertically extending strap members 122, the lower ends of which are welded to the shaft section 113 and the upper ends of which are apertured to receive the laterally turned end 125 of a control rod, the forward end of which is threaded and extended through an aperture in a vertically extending portion 127 that forms a part of a bracket that is fixed to the angle 35. A spring 128 is disposed about the press wheel control rod and is carried between the rear face of the bracket 127 and the forward face of an adjustable set screw collar 129 carried by the above mentioned control rod. Preferably, the parts are arranged so that the spring 128 exerts a continual bias tending to swing the press wheel downwardly, or in a generally counterclockwise direction as shown in the drawing.

A jackshaft 145 is carried by the main frame in transverse alignment with the press wheel frame pivots 46 by which the laterally outer frame members 111 of the press wheel frame are swingably connected for generally vertical movement relative to the main frame 31. The jackshaft 145 is supported from the main frame angle 35 by depending brackets that include bearing members 147 in which the jackshaft 145 is rotatably disposed. Each bearing member 147 is provided with a laterally outwardly extending socket section adapted to rockably receive a trunnion 154 that is fixed, as by welding, in an opening formed in the associated laterally inner press wheel frame member 112. By virtue of the means just described, the jackshaft 145 is disposed in axially alignment with the press wheel frame pivot members 46.

The planter frame members 36 and 37 are rigidly interconnected by a center member 230 and the forward ends of the frame sections 39 are pivotally connected, as at 232, to the ends of a transverse yoke member 233 to the upper face of which a pair of laterally spaced apart socket members 234 are welded. The open portions of the socket members 234 face rearwardly and are adapted to receive the central portion of a transverse drawbar member 235 that is polygonal, preferably square, in cross section. The ends of the bar 235 are reduced, as at 237, to receive the connectors at the rear ends of the two lower links 250 of a conventional three-link system. An angle member 238 having a notch 239 is fixed, as by welding, to the central portion of the bar 235 and acts to center the latter between the socket members 234.

A mast section 241 is fixed to the socket members 234 at their upper sides and extend upwardly generally directly above the notch 239. The tractor may carry a sway prevention bracket 243, the rear arm 244 of which is adapted to be disposed within the notch 239, acting through the horizontal flange of the member 238 and the associated pair of locking pins 245 to prevent lateral displacement of the planter relative to the tractor. The upper end of the mast section 241 is connected by a brace rod 246 with the rear frame bar 35 of the planter. The upper portion of the mast section 241 is made up of a pair of upwardly converging bars 247 that are spaced apart at their upper ends to receive a connector 251 by which the rear portion of the upper link 252 of the associated tractor hitch system may be connected with the hitch unit 241. The distance vertically between the upper and lower limbs of the U-shaped socket members 234 is greater than the corresponding dimension of the square bar 235, and similarly the fore-and-aft distance between the socket members 234 and the lock pins 245 is greater than the corresponding dimension of the square bar 235. Therefore, the latter is capable of both lateral and vertical swinging relative to the implement structure. An extension 255 is secured, as by welding, to the upper end of the bars 247 and receives the forward portion of an adjusting crank rod member 256. A rear member 257 adjustably receives the rear threaded end of the rod 256 and the member 257 is slotted to receive the pin carried by the upwardly extending arm 121 that is fixed to the press wheel frame shaft or frame member 113.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

A hitch device for connecting an implement to a tractor having generally vertically swingable link means, said device comprising a generally vertical frame having at its lower portion a pair of bar-receiving sockets fixed to said vertical frame in laterally spaced apart relation, a hitch bar disposed in said sockets and including an abutment in the form of an angle member extending along said bar and having ends engageable with said sockets to limit lateral shifting of said bar in said sockets, said angle member having a vertical flange notched centrally, and means engageable with the central notched portion of said abutment member to limit lateral movement of said vertical frame relative to the tractor.

References Cited in the file of this patent

UNITED STATES PATENTS

| | | |
|---|---|---|
| 2,131,068 | Payne | Sept. 27, 1938 |
| 2,692,148 | Bywater | Oct. 19, 1954 |
| 2,710,569 | Altgelt | June 14, 1955 |
| 2,775,179 | Chambers et al. | Dec. 25, 1956 |
| 2,793,880 | Oehler et al. | May 28, 1957 |